United States Patent [19]
Amo et al.

[11] Patent Number: 5,650,498
[45] Date of Patent: Jul. 22, 1997

[54] WATER-SOLUBLE AZO COMPOUND IN THE FORM OF GRANULES HAVING A SPHERICAL SHAPE AND PROCESS FOR PRODUCING THE SAME

[75] Inventors: Hideo Amo; Masaya Kajimoto; Akihiko Goto, all of Naruto, Japan

[73] Assignee: Otsuka Kagaku Kabushiki Kaisha, Osaka, Japan

[21] Appl. No.: 325,510

[22] Filed: Oct. 19, 1994

[30] Foreign Application Priority Data

Feb. 21, 1994 [JP] Japan .................................. 6-047709

[51] Int. Cl.$^6$ .................................................. C07C 245/00
[52] U.S. Cl. ........................ 534/887; 534/586; 534/738; 534/838; 534/886
[58] Field of Search ........................ 534/886, 738, 534/586

[56] References Cited

U.S. PATENT DOCUMENTS

| | | | |
|---|---|---|---|
| 2,520,338 | 8/1950 | Robertson | 534/886 |
| 4,117,066 | 9/1978 | Mollet et al. | 264/117 |
| 4,256,636 | 3/1981 | Roos et al. | 534/886 X |
| 4,560,747 | 12/1985 | Bruttel et al. | 534/887 |
| 4,684,717 | 8/1987 | Ashitaka et al. | 534/586 |
| 4,684,718 | 8/1987 | Ashitaka et al. | 534/586 |
| 4,916,216 | 4/1990 | Tanaka et al. | 534/738 |
| 5,010,177 | 4/1991 | Lai et al. | 534/586 |
| 5,010,178 | 4/1991 | Lai | 534/586 |
| 5,013,445 | 5/1991 | Leimen et al. | 210/729 |
| 5,037,963 | 8/1991 | Lai | 534/587 |

FOREIGN PATENT DOCUMENTS 1075444  4/1980  Canada .................................. 264/17

*Primary Examiner*—Floyd D. Higel
*Attorney, Agent, or Firm*—Kubovcik & Kubovcik

[57] ABSTRACT

The present invention provides a process for producing a spherical granule of a water-soluble azo compound, which comprises dispersing a water-soluble azo compound in a water-insoluble solvent and then add dropwise water or a hydrophilic solvent dissolving the water-soluble azo compound with stirring to granulate the water-soluble azo compound in the solution, and produce the spherical granule of the water-soluble azo compound.

3 Claims, No Drawings

WATER-SOLUBLE AZO COMPOUND IN THE FORM OF GRANULES HAVING A SPHERICAL SHAPE AND PROCESS FOR PRODUCING THE SAME

BACKGROUND OF THE INVENTION

The present invention relates to a spherical granule of a water-soluble azo compound, and a process for producing the same.

As azo compounds which are highly useful as a radical polymerization initiator, etc. for producing high polymer compounds such as water absorbing resin, high polymer coagulant, etc., there have been known the compounds represented by the formulas (1) and (2). With the progress of a polymerization apparatus, e.g. scale enlargement, automating and energy-saving, azo compounds which cause no binding and agglomeration and have a shape suitable for charging smoothly at the time of introduction have been strongly requested. Further, since some water-soluble azo compounds have skin irritant action, products having a shape which causes no dust have been requested in view of safety.

However, there is a large risk and a fear of deterioration of quality in granulation by means of a normal granulation method because these compounds have high thermal decomposition properties and explosive properties. Therefore, a trial on granulation of these azo compounds have hardly been made, heretofore.

As the prior art in this field, there have been known a granulation method by means of an extrusion granulation publication is described in JP-A-99045/1988. This method directed to a method which comprises adding water to a powder, kneading the resulting mixture to adjust a binding power of the powder, and after compressing to minimize voids, extruding the kneaded mixture through a hole having a specific shape and then granulating the extrudate with a granulator, pelleter, etc. However, since the granules obtained by this method have a cylindrical shape, rolling fluidity is not sufficient. Therefore, abnormality such as choking sometimes arises in the introduction step. Further, the granules have a shape wherein corners are liable to be broken off and, therefore, generation of dust can not be sufficiently inhibited. Further JP-A-99045/1988 also describes a spray-granulation method and rolling-granulation method but these methods can not afford a spherical granule of the present invention.

An object of the present invention is to solve the above problem and to provide a spherical water-soluble azo compound wherein generation of dust is hardly arises, and a process for producing the same.

The above and other objects of the invention will become apparent from the following description.

The present invention provides a process for producing a spherical granule of a water-soluble azo compound, which comprises dispersing a water-soluble azo compound in a water-insoluble solvent and then adding dropwise water and/or a hydrophilic solvent which dissolves the water-soluble azo compound with stirring to granulate the water-soluble azo compound in the solution, and produce the spherical granule of the water-soluble azo compound.

DESCRIPTION OF THE PREFERRED EMBODIMENTS

The process of the present invention can be preferably applied to a water-soluble azo compound, particularly to an azo compound represented by the formula (1) or an azo compound represented by the formula (2).

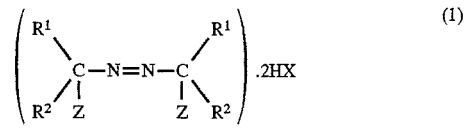

$R^1$ and $R^2$ are the same or different and are each an alkyl group or cycloalkyl group, Z is a group represented by the formula (3) or formula (4)

$R^3$ is a hydrogen atom, alkyl, allyl, phenyl or a substituted phenyl group, $R^4$ is a hydrogen atom, alkyl, phenyl or a substituted phenyl group, $R^5$ is a alkylene or substituted alkylene group, $R^6$ is a hydrogen atom or hydroxyalkyl group, X is Cl, Br or a $CH_3COO-$ group

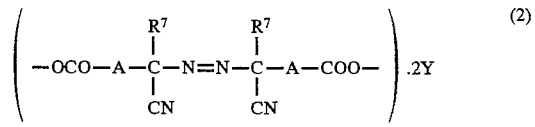

A is a alkylene or substituted alkylene group, $R^7$ is an alkyl group,

Y is alkali metal, alkaline earth metal (2Y) or $NH_4$.

Preferred examples of the alkyl group for $R^1$, $R^2$, $R^3$, $R^4$ and $R^7$ include alkyl groups having 1 to 6 carbon atoms, such as methyl, ethyl, propyl, butyl, pentyl and hexyl. Preferred examples of the cycloalkyl group for $R^1$ and $R^2$ include cycloalkyl groups having 3 to 6 carbon atoms, such as cyclopropyl, cyclobutyl and cyclohexyl. Preferred examples of the substituted phenyl group for $R^3$ and $R^4$ include substituted phenyl groups such as tolyl, xylyl and cumyl. Preferred examples of the alkylene group for $R^5$ and A include alkylene groups having 1 to 6 carbon atoms, such as methylene, ethylene, propylene, butylene and hexenylene. Preferred examples of the substituent of the substituted alkylene group include alkoxy group having 1 to 3 carbon atoms and hydroxyl group. The alkylene group substituted with 1 to 3 of these substituents are preferred. Preferred examples of the hydroxyalkyl group for $R^6$ include hydroxyalkyl groups having 1 to 6 carbon atoms, such as hydroxymethyl, hydroxyethyl, hydroxypropyl and hydroxyhexyl. Examples of the alkali metal for Y include Na, K and the like, and examples of the alkaline earth metal for Y include Mg, Ca, Ba and the like. Among them, Na and K are preferred.

In the present invention, a water-soluble azo compound is firstly dispersed/suspended in a water-insoluble solvent, followed by stirring. In this case, it is important to conduct stirring so that the mixture is homogeneously converted into a slurry. The temperature at the time of stirring is set to a temperature at which the decomposition the water-soluble azo compound is prevented in the manufacturing process. The stirring is conducted continuously for 5 minutes to 20 hours, preferably 10 minutes to 3 hours, including the dropping time of water and/or a hydrophilic solvent dissolving the water-soluble azo compound.

The water-insoluble solvent used in the present invention may be any one which does not dissolve the water-soluble azo compound and is not specifically limited, and can be suitably selected. It is preferred to use solvents such as halogenated hydrocarbons, aliphatic hydrocarbons, aromatic hydrocarbons, esters, ethers and the like. As the halogenated hydrocarbon, for example, there can be used methyl chloride, dichloromethane, chloroform, carbon tetrachloride, 1,2-dichloroethane, 1,1-trichloroethane, Trichlene, Perclene and 1,2-dichloropropane. As the aliphatic hydrocarbon, for example, there can be used pentane, hexane, heptane, octane and decane. Examples of the aromatic hydrocarbon are benzene, toluene, xylene, mesitylene, monochlorobenzene and dichlorobenzene. Examples of the esters are ethyl acetate, butyl acetate and dioctyl phthalate. Examples of the ethers include ethyl ether, isopropyl ether and tetrahydrofuran. These solvents can be used alone or in combination of two or more kinds of the above.

The water-insoluble solvent is usually used within a range from 1 to 100 parts by weight, preferably from 1.5 to 20 parts by weight per one part by weight of the water-soluble azo compound. With stirring, water or a hydrophilic solvent dissolving the water-soluble azo compound is added dropwise to the suspension of the water-soluble azo compound. Water or the hydrophilic solvent dissolving the water-soluble azo compound to be used has such a property that is superior in hydrophilic nature to the azo compound in comparison with the above water-insoluble solvent. Water or the hydrophilic solvent dissolving the water-soluble azo compound is added dropwise in an amount enough to dissolve the water-soluble azo compound partially. It is preferred that the amount is usually 1 to 50% by weight, preferably 3 to 20% by weight, based on the amount of the water-soluble azo compound. As the hydrophilic solvent dissolving the water-soluble azo compound, for example, there can be used lower alcohols such as methanol, ethanol and isopropanol. These hydrophilic solvents can be used singly or in a mixture of at least one of them. It is advantageous to use water because of cheap cost and high safety. It is advantageous to use the lower alcohol because the drying step after filtration can be conducted in a short period of time. In case of using several lower alcohols conjointly, it is possible to decrease a density of a spherical granule and enhance dispersibility thereof.

In case of dropping, a suitable amount of solvents dissolving in both solvents, surfactants, suspended particle stabilizers may be added to any one of the above solvents in advance in order to stabilize the formation step of the granule and to form the granule into spherical shape homogeneously. Examples of the solvent dissolving in both solvents include acetone, methanol, ethanol, isopropanol, acetonitrile and ethylene glycol. The surfactant may be any one of anionic, cationic and nonionic surfactants. As the suspended particle stabilizer, there can be used those which dissolves in water, and preferred examples thereof include water-soluble high polymer compounds such as polyvinyl alcohol, carboxymethyl cellulose (CMC), polyacrylamide and cornstarch. It is preferred that the above reaction is conducted at a temperature at which the decomposition of the water-soluble azo compound can be prevented in the manufacturing step. The temperature varies depending on the kind of the water-soluble azo compound, but the reaction can be usually conducted within a range from 0° to 50° C., preferably at normal temperature.

When the mixed solution is stirred continuously after dropping, the formation of the granule begins with time. At the time at which 10 minutes to 3 hours has passed, almost all of the water-soluble azo compound present in the solution becomes the granule. In the present invention, the granule thus obtained has a spherical shape. However, granules having a slightly deformed spherical shape are also included, in addition to granules having perfect spherical shape.

The resulting suspension of the spherical granule is filtered by means of a usual method to separate the spherical granule only, and then dried to give the desired product. The drying can also be conducted under reduced pressure. The spherical granule of the present invention has an average particle size of 0.01 to 30 mm, more preferably 1.8 to 5 mm.

The following Examples further illustrate the present invention in detail but are not to be construed to limit the scope thereof.

EXAMPLE 1

5 ml of water was added dropwise over 3 minutes while a mixture of 100 ml of Trichlene and 30 g of 2,2'-azobisamidinopropane dihydrochloride was stirred at 400 rpm, followed by stirring for additional 60 minutes to give a suspension of a spherical granule. The suspension was filtered and dried at normal temperature at 1 Torr for 4 hours to give 29.9 g of a granule having an average particle size of 3 mm.

EXAMPLE 2

5 ml of water was added dropwise over 3 minutes while a mixture of 100 ml of 1,2-dichloroethane and 40 g of sodium 4,4'-azobis(4-cyanovalerate) was stirred at 600 rpm, followed by stirring for additional 60 minutes to give a suspension of a spherical azo compound. The suspension was filtered and dried to give 39 g of an azo compound having an average particle size of 2.5 mm.

EXAMPLE 3

A mixture of 100 ml of Trichlene, 4.8 ml of methyl alcohol and 50 g of 2,2'-azobisamidinopropane dihydrochloride was stirred at 20° C. at 500 rpm. 3.2 ml of water was added by several portions over about 70 minutes. Thereafter, the mixture was stirred for additional about 10 minutes and, as a result, it was observed that a granule was growing. It was observed that the granule was further growing gradually until the time at which about 30 minutes have passed. After 60 minutes, a spherical granule was obtained by filtration and dried at normal temperature under reduced pressure (1 Torr) for 4 hours to give 49.5 g of a granule. An average particle size of the granule was 3 mm.

EXAMPLE 4

A mixture of 100 ml of 1,2-dichloropropane, 5 ml of methyl alcohol and 50 g of 2,2'-azobisamidinobutane dihydrochloride was stirred at 15° C. at 450 rpm. 5 ml of water was added by several portions over about 10 minutes. Thereafter, the mixture was stirred continuously for additional 60 minutes to give a suspension of a spherical granule. The suspension was filtered and dried at normal temperature under reduced pressure (1 Torr) for 4 hours to give 49.6 g of a granule. An average particle size was 3.2 mm.

EXAMPLE 5

A mixture of 100 ml of 1,2-dichloropropane and 50 g of 2,2'-azobisamidinobutane dihydrochloride was stirred at 15° C. at 500 rpm. 5 ml of ethanol was added by several portions over about 30 minutes. Thereafter, the mixture was stirred continuously for additional about 30 minutes to give a suspension of a spherical granule. The suspension was filtered and dried at normal temperature under reduced pressure (1 Torr) for 30 minutes to give 47.3 g of a granule. An average particle size was 2.8 mm.

EXAMPLE 6

The same procedure was repeated in the same manner as in Example 1 except that a solvent mixture of 4 ml of water and 1 ml of methanol was used in place of 5 ml of water, whereby giving 29.8 g of a spherical granule having an average particle size of 2.5 mm.

The present invention provides a spherical water-soluble azo compound wherein generation of dust is hardly arisen, with safety.

We claim:

1. A process for producing a water-soluble azo compound in granular form, individual granules having a substantially spherical shape, which comprises:

providing a water-soluble azo compound;

dispersing the water-soluble azo compound in a first water-insoluble organic solvent to form a slurry; and adding water, a second solvent in which the water-soluble azo compound is at least partially soluble, or a mixture of water and said second solvent to said slurry with stirring to granulate the water-soluble azo compound, wherein the water-soluble azo compound is represented by the formula (1) or (2)

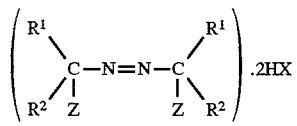 (1)

$R^1$ and $R^2$ are same or different and are each alkyl or cycloalkyl,

Z is a group represented by the formula (3) or formula (4)

 (3)

 (4)

$R^3$ is hydrogen, alkyl, allyl, phenyl or phenyl substituted with up to two alkyl groups, $R^4$ is hydrogen, alkyl, phenyl or phenyl substituted with up to two alkyl groups, $R^5$ is alkylene or alkylene substituted with alkoxy or hydroxy, $R^6$ is hydrogen or hydroxyalkyl, X is Cl, Br or $CH_3COO$—

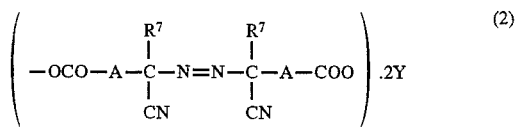 (2)

A is alkylene or substituted alkylene, $R^7$ is alkyl,

Y is alkali metal, alkaline earth metal (2Y) or $NH_4$.

2. A process as defined in claim 1 wherein, in the formula (1), Z is a group of the formula (4), $R^1$ and $R^2$ are each alkyl, $R^3$ and $R^4$ are each hydrogen.

3. A process as defined in claim 1 wherein, in the formula (2), A is ethylene, $R^7$ is methyl.

* * * * *